Patented Jan. 4, 1949

2,458,221

UNITED STATES PATENT OFFICE 2,458,221

METHOD OF REDUCING ODOR AND SURFACE TACK OF NEOPRENE OBJECTS

Edward C. Svendsen and William J. Clayton, Mishawaka, Ind., assignors to United States Rubber Company, New York, N. Y., a corporation of New Jersey No Drawing. Application October 5, 1944, Serial No. 557,380

5 Claims. (Cl. 260—92.7)

The present invention provides a method of treating various types of objects made of neoprene to reduce the strong, disagreeable odor and eliminate the surface tack.

There are now on the market a number of types of neoprene [polymers of chloroprene], that are available as a latex or in the solid form. Some of these types of neoprene after they are molded or are otherwise shaped and cured possess a strong disagreeable odor and have considerable surface tack.

The present invention was developed more particularly to treat sponge rubber formed from neoprene latex, chemically known as polychloroprene latex, to reduce the odor and surface tack, but may be employed to treat sponge or porous rubber formed from neoprene gum stock, and it may also be employed to treat sheets, threads and various shaped articles formed from neoprene latex or neoprene in the solid form.

The present method in its broad aspect contemplates the treatment of neoprene after it has been given a definite shape, and before or after it has been cured, to decrease the odor and surface tack. This is accomplished by washing such shaped neoprene object in a weak solution of any one of a number of inorganic chlorides. It is found that some but not all of the inorganic chlorides work satisfactorily, as will be hereinafter more clearly set forth.

In making neoprene compounds for the production of various rubber articles it is usual to add zinc oxide to help sensitize and cure the rubber. The treatment of objects made of several types of neoprene on the market, in accordance with the present invention, appears to establish the fact that satisfactory results can be secured by washing such neoprene objects in any inorganic chloride which will react with the zinc oxide in the neoprene compound to form zinc chloride. Those inorganic chlorides which will not react with the zinc oxide, such for example as sodium chloride and dimethyl amine chloride, do not have the desired results of removing the odor or surface tack.

Neoprene, as above stated, is now available on the market in a number of different types. It is believed the treatment of the present invention may be used satisfactorily to treat shaped rubber articles formed of any of the more common types of neoprene or polychloroprene, whether such articles are formed from neoprene in the latex or solid form, provided such neoprene also contains a small amount of zinc oxide.

Actual tests show that sponge rubber formed of neoprene latex foam can be freed of practically all odor and surface tack by washing the sponge rubber with a 2% aqueous solution of any one of the following inorganic chlorides: ammonium chloride, zinc chloride, ferric chloride, barium chloride, magnesium chloride or calcium chloride. Ammonium chloride is considered to be best suited for commercial use because of its availability, low cost and volatility. The treatment of neoprene with any one of these chlorides is believed to provide an effective polymerization catalyst for the lower polymers present in the neoprene, and that the polymerizing of these lower polymers on the surface of the rubber eliminates the odor and tack.

The particular types of neoprene used in testing the six chloride solutions just mentioned were Neoprene 571, Neoprene 60 and Neoprene GN. These three types of neoprene were also tested by washing sponge rubber made of neoprene latex with a 2% aqueous solution of sodium chloride, which was found to have practically no effect in decreasing the odor or removing the surface tack. A 2% aqueous solution of dimethyl amine chloride was likewise found to have practically no effect upon the odor or surface tack of similarly formed neoprene sponge rubber.

In order further to illustrate the invention, the following examples are given:

Example I

A conventional neoprene such as Neoprene 571 latex compound is frothed by whipping the latex compound into a foam, or by mechanically or otherwise producing such foam. To the latex is added, before or after it is frothed, zinc oxide which helps to sensitize and cure the latex. There is also added to the latex, preferably near the end of the foaming operation a sensitizing or gelling agent, such as alkali silicofluoride. The foam is then poured into molds where it is allowed to set to an irreversible gel. Following this, the gelled foam is dried from 8 to 12 hours at 180° F. This dried foam which has a strong, disagreeable odor and surface tack is then washed in a 2% solution of zinc chloride. The excess washing solution is removed, preferably by squeezing the sponge rubber, which is then dried from 8 to 12 hours at 180° F. At the end of this second drying period the molded sponge rubber had lost practically all of its disagreeable odor and showed no signs of surface tack. At normal temperatures the permanent set of neoprene foam when given this treatment is comparable to that of well-cured rubber latex foam.

Example II

According to this method the gelled neoprene foam formed of Neoprene 571 latex compound and containing zinc oxide is cured in open steam for thirty minutes. This is followed by thirty minutes water cure of a 1% scolution of zinc chloride at 212° F. The excess zinc chloride solution is removed by squeezing and the sponge rubber is then dried from 8 to 12 hours at 180° F. At the end of this treatment the neoprene sponge rubber was found to be free of the disagreeable odor and surface tack.

The conditions of curing, washing and drying are not critical, and the concentration of the zinc chloride is not critical. The first of these two examples is preferred as producing a better sponge rubber than Example II. In carrying out these two examples it is important that a thin layer of the solution of zinc chloride or other inorganic chlorides above listed be deposited on the cell walls of the neoprene sponge, and also that the treated sponge be dried for from 8 to 12 hours at 180° F. When the neoprene object treated has a porous or sponge construction the inorganic chloride washing solution will enter those pores that are open to the atmosphere to remove their odor.

The method of the present invention may be used not only to treat sponge or porous rubber formed of neoprene but may also be used to treat non-porous neoprene rubber in the form of sheets, threads and molded articles. Washing of such porous or non-porous neoprene objects with an inorganic chloride solution containing a chloride selected from the above list, may be carried out before or after the neoprene object is cured. Following the chloride treatment the excess chloride solution is removed, whereupon the neoprene object if not already cured, may now be cured. In any case after the treatment with the chloride solution the rubber should be thoroughly dried for a number of hours at elevated temperature.

It will be seen from the foregoing that the present invention provides a simple and inexpensive method of treating various types of neoprene articles to reduce the odor and eliminate surface tack.

Having thus described our invention, what we claim and desire to protect by Letters Patent is:

1. The method of treating polychloroprene sponge rubber containing zinc oxide to reduce its odor and surface tack, which consists in washing the sponge rubber in an aqueous solution of inorganic chloride that will react with zinc oxide and having a strength of from 1 to 2 percent and selected from the group consisting of ammonium chloride, zinc chloride, ferric chloride, barium chloride, magnesium chloride and calcium chloride, removing the excess solution and drying at elevated temperature.

2. The method of treating polychloroprene sponge rubber containing zinc oxide to reduce its odor and surface tack, which consists in washing the sponge rubber in a weak aqueous solution containing a small amount sufficient to reduce the odor of inorganic chloride that will react with the zinc oxide and selected from the group consisting of ammonium chloride, zinc chloride, ferric chloride, barium chloride, magnesium chloride and calcium chloride, removing the excess solution and drying at elevated temperature.

3. The method of treating polychloroprene sponge rubber containing zinc oxide to reduce its odor and surface tack, which consists in washing the rubber in a weak aqueous solution containing a small amount sufficient to reduce the odor of ammonium chloride, removing the excess solution and drying at elevated temperature.

4. The method of treating a formed rubber object made from polychloroprene containing zinc oxide to reduce the odor and surface tack of the rubber, which consists in washing such object in an aqueous solution of inorganic chloride that will react with the zinc oxide and having a strength of from 1 to 2 percent and selected from the group consisting of ammonium chloride, zinc chloride, ferric chloride, barium chloride, magnesium chloride and calcium chloride, removing the excess solution and drying at elevated temperature.

5. The method of treating a formed rubber object made from polychloroprene containing zinc oxide to reduce the odor and surface tack of the rubber, which consists in washing such object in a weak aqueous solution containing a small amount sufficient to reduce the odor of inorganic chloride that will react with the zinc oxide and selected from the group consisting of ammonium chloride, zinc chloride, ferric chloride, barium chloride, magnesium chloride and calcium chloride, removing the excess solution and drying at elevated temperature.

EDWARD C. SVENDSEN.
WILLIAM J. CLAYTON.

FOREIGN PATENTS

The following references are of record in the file of this patent:

UNITED STATES PATENTS

| Number | Name | Date |
|---|---|---|
| 2,076,949 | Kirby | Apr. 13, 1937 |
| 2,109,968 | Collins | Mar. 1, 1938 |
| 2,161,949 | Calcott | June 13, 1939 |
| 2,305,164 | Hubbard | Dec. 15, 1942 |
| 2,340,233 | Szegvari | Jan. 25, 1944 |

OTHER REFERENCES

Dales et al., "Neoprene Latex Type 57," Report No. 39–3, May 1939, published by E. I. du Pont de Nemours and Co., Rubber Chemicals Div., Wilmington, Del., pages 5–9 and 11–14.